Jan. 28, 1964     K. D. BITTER     3,119,600
LINE-PULLING CARRIERS FOR CONDUIT-THREADING APPARATUS
AND METHOD OF FABRICATION THEREOF

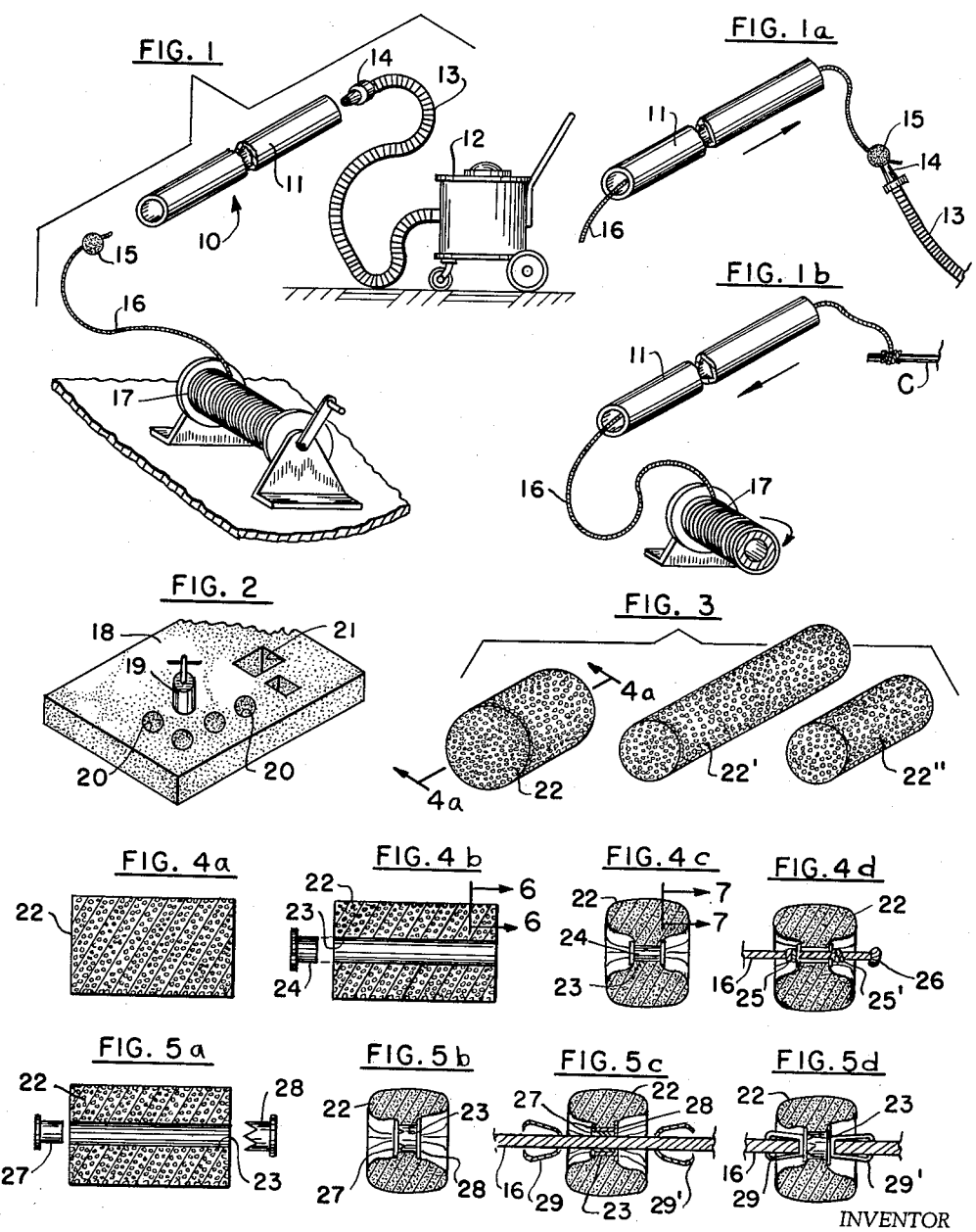

Filed Dec. 20, 1961     2 Sheets-Sheet 2

INVENTOR
KENNETH D. BITTER

BY *Leonard Gleser*

ATTORNEY

United States Patent Office 3,119,600
Patented Jan. 28, 1964

3,119,600
LINE-PULLING CARRIERS FOR CONDUIT-THREADING APPARATUS AND METHOD OF FABRICATION THEREOF
Kenneth D. Bitter, Baltimore, Md., assignor to The Black and Decker Manufacturing Company, Towson, Md., a corporation of Maryland
Filed Dec. 20, 1961, Ser. No. 160,776
3 Claims. (Cl. 254—134.4)

The present invention relates to line-pulling carriers for use in conjunction with conduit-threading apparatus, and more particularly, to such carriers that are formed from a compressible material having a cellular structure.

The present invention while not necessarily confined thereto, may nevertheless find more particular utility for use in conjunction with a vacuum-actuated apparatus for threading lines in a pipe or conduit, such as is described in the co-pending Riley application Ser. No. 142,324, filed October 2, 1961, assigned to the assignee of the present invention, and now issued as U.S. Patent 3,091,433. In this co-pending application, a portable source of suction is utilized to draw a line through a conduit, such as a three-inch underground pipe several hundred feet in length. The portable source of suction may comprise a portable electric vacuum cleaner, preferably of the wet pick-up type, which has a nozzle inserted at one end of the conduit. A carrier is inserted at the opposite end of the conduit, and a line is secured to the carrier. The suction effect of the vacuum cleaner draws the carrier, and the line secured thereto, through the conduit. Once the conduit is thus threaded, the line may be secured to an electrical cable and utilized to draw the cable through the conduit.

One salient advantage of the vacuum-actuated method of conduit-threading, among others, involves the capacity of the vacuum cleaner for continuously drawing or passing large quantities of air, which is especially important in conduits having relatively-large diameters. This continuous capacity tends to decrease, or eliminate altogether, the number of required repulls, a "repull" being defined as each drawing of a successively heavier and stronger line through the conduit until the conduit is threaded with a line or rope having sufficient tensile strength to draw or pull the electrical cable through the conduit. Consequently, it is desirable to thread the conduit initially with a line having a relatively-high tensile strength (in the order of 400 to 700 pounds) such that the initial line may be secured directly to an electrical cable to draw the cable through the conduit without otherwise resorting to a number of time-consuming successive repulls. The unlimited capacity of the vacuum cleaner for passing large quantities of air, as herein noted, has the advantage of reducing the number of repulls; but in addition to the actuating source itself, the line and the carrier should be as lightweight as possible. Strong, lightweight, and relatively-inexpensive lines are readily available, but nothing has heretofore existed on the commercial market to provide a relatively lightweight line-pulling carrier suitable for use in conjunction with a vacuum-actuated conduit-threading apparatus.

Accordingly, it is an object of the present invention to provide, for use in conjunction with conduit-threading apparatus, a line-pulling carrier comprising a compressible member formed from a material having a relatively-dense open-cell structure, such as foamed polyurethane, in combination with a line having one end secured to the body.

It is another object of the present invention to provide for use in conjunction with conduit-threading apparatus, a carrier structure comprising a body member formed from a compressible material, means to axially compress the body member such that the body member assumes a substantially spherical shape, a line, and means to secure the line to the body member.

It is yet still another object of the present invention to provide a method for fabricating a line-pulling carrier for use in conjunction with conduit-threading apparatus, which comprises the steps of: providing a carrier body from a compressible material having a cellular structure, the body having a major axis; forming an axial bore along the major axis of the body; inserting fastening means within the axial bore of the body; and drawing the fastening means axially together, thereby axially compressing the body, and thereby causing the body to approach a substantially spherical shape.

Although various types of material having an open-cell structure are feasible within the scope of the present invention, the material presently most desirable is a polyfoam plastic material, such as foamed polyurethane. For use as a line-pulling carrier in a vacuum-actuated conduit-threading apparatus, the polyfoam material has a number of ideal characteristics, which may be enumerated briefly, as follows: one, it sufficiently fills the internal cross-section of the conduit so as to establish a pressure differential when a vacuum is applied to one end of the conduit; two, it is light in weight and will move, in the direction of the negative pressure, with but a slight pressure differential being established; three, it has a low frictional resistance or drag with respect to the internal walls of the conduit, and hence its travel through the conduit is not impaired; four, being inherently resilient and easily compressible, it conforms instantaneously to changes in the internal cross-section of the conduit, and thus it will by-pass kinks and flat bends, or else foreign matter inadvertently placed in the conduit; five, it will pass through water or other liquids and will act as a sponge to scour or scrub the internal walls of the conduit of loose foreign matter; six, it is impervious to contaminants, such as oils, acids, or alkalies that may be in the conduit; seven, being resilient, it is not subject to a permanent deformation, and hence it is re-usable for repeated threading operations in other conduits; eight, it has good dielectric strength as a non-conductor of electricity, and thus it is safe for use in conduits or areas where electrical cables may possibly be exposed; nine, it may be easily cut or molded without the use of special tooling, and it may be fabricated easily into a carrier structure using simple hand tools in remote localities; and ten, it is very inexpensive and often may be fabricated from scrap materials.

These and other objects of the present invention will become apparent from a reading of the following specification, taken in conjunction with the enclosed drawings, in which:

FIGURE 1 is a pictorial view of a vacuum-actuated apparatus for threading a line through a conduit, showing the initial stage in providing a portable source of suction at one end of the conduit, and further showing a carrier being inserted at the opposite end of the conduit;

FIGURE 1a is a pictorial view showing a portion of FIGURE 1, but showing the carrier already drawn through the conduit;

FIGURE 1b is a corresponding pictorial view of a portion of FIGURE 1, but showing the threaded line secured to a cable for purposes of drawing the cable through the conduit;

FIGURE 2 shows a means whereby a plurality of carrier bodies may be cut out from a suitable block of plastic polyfoam material;

FIGURE 3 shows three typical sizes of cylindrical plugs that may be cut out of the block of polyfoam material;

FIGURE 4a shows one of the cylindrical plugs in section, the view being taken along the lines 4a—4a of FIGURE 3;

FIGURE 4b shows the cylindrical plug of FIGURE 4a formed with an axial bore and further showing, in exploded relationship, a suitable grommet;

FIGURE 4c shows the effect of inserting the grommet within the axial bore of the cylindrical plug of FIGURE 4b and axially compressing the grommet by means of a suitable tool, such that the plug is axially compressed and approaches a substantially spherical form;

FIGURE 4d shows a line inserted within the fastening means of FIGURE 4c and knotted so as to secure the line to the carrier;

FIGURE 5a shows a two-piece grommet in exploded relationship to the plug of FIGURE 4b;

FIGURE 5b shows the two-piece grommet rigidly clamped together, whereby the cylindrical plug is axially compressed so as to again assume a generally spherical shape;

FIGURE 5c shows the line inserted within the grommet and further shows a pair of slidable retainers, one on either side of the plug;

Figure 6:
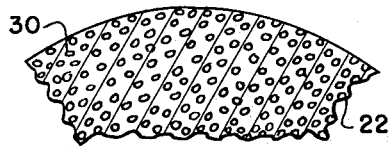
Figure 7:
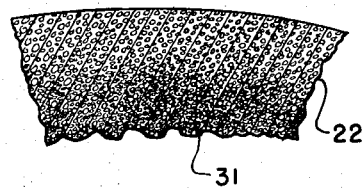
Figure 8:
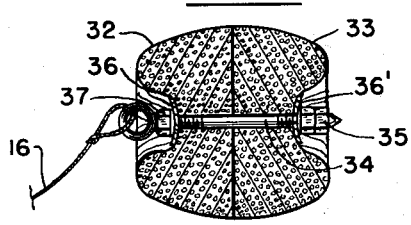
Figure 9:
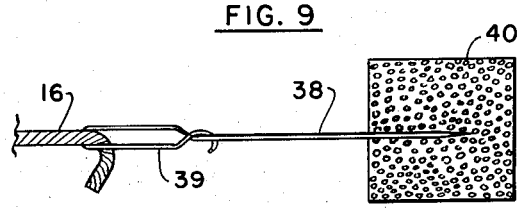
Figure 10:
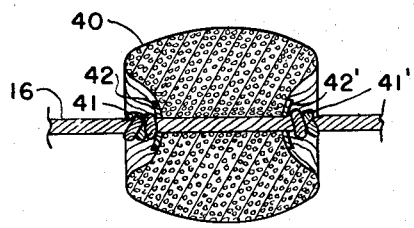
Figure 11:
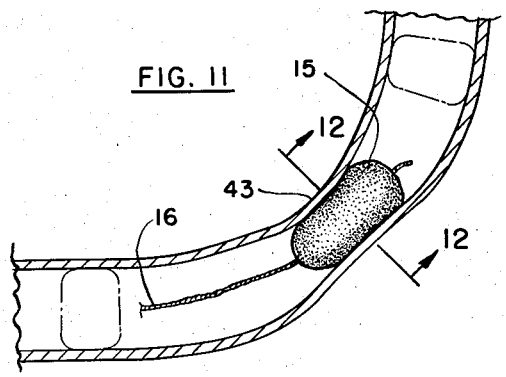
Figure 12:
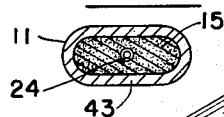
Figure 13:
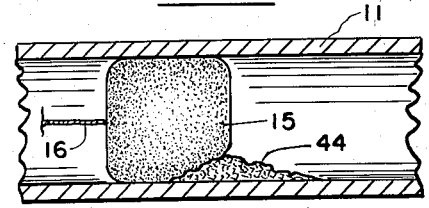
Figure 14:
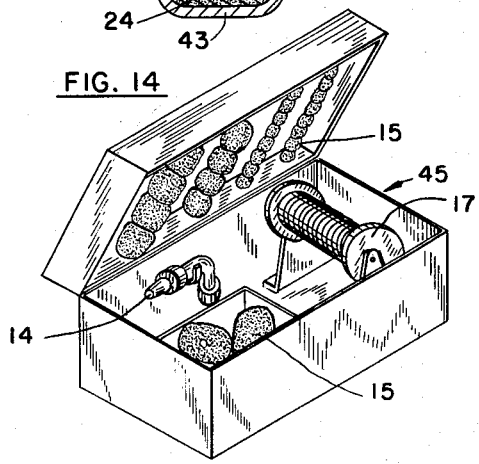

FIGURE 5d corresponds to FIGURE 5c, but shows the retainers squeezed down upon the line so as to retain the carrier to the line;

FIGURE 6 is a sectional view taken across the lines 6—6 of FIGURE 4b, showing the relatively dense open-cell structure of the polyfoam material;

FIGURE 7 is a sectional view taken across the lines 7—7 of FIGURE 4c, corresponding substantially to that of FIGURE 6, but showing the cellular structure of the polyfoam material in its compressed state;

FIGURE 8 shows another means of assembling a carrier from a pair of cylindrical plugs stacked one on top of another;

FIGURE 9 shows how a needle may be forced through a suitable plug of polyfoam material so as to draw the line through the plug;

FIGURE 10 shows the line thus drawn through the plug of FIGURE 9 and further shows the line secured to the plug by means of a pair of washers and a pair of knots formed on the line;

FIGURE 11 shows the passage of the carrier of FIGURE 4d through a kink or elbow formed in the conduit;

FIGURE 12 is a sectional view taken along the lines 12—12 of FIGURE 11, showing how the carrier instantaneously acquires the given internal cross-section or configuration of the conduit;

FIGURE 13 shows the carrier of FIGURE 4d passing by an internal obstruction within the conduit; and FIGURE 14 shows a portable kit box containing a number of pre-fabricated carriers, together with a nozzle and a reel for use with the vacuum-actuated conduit-threading apparatus.

With reference to FIGURE 1, there is illustrated the overall conduit-threading apparatus 10 in conjunction with which the carriers of the present invention may find more particular utility. The apparatus 10 is adapted to thread a line through the conduit 11 and comprises a portable source of suction, such as the portable electric vacuum cleaner 12, having a hose 13 and nozzle 14, in combination with a carrier 15 secured to a line 16, which is wound upon a suitable drum or reel 17. The nozzle 14 is applied to one end of the conduit 11, and the carrier 15 is inserted in the opposite end of the conduit 11.

With reference to FIGURE 1a, the vacuum cleaner 12 has thus been actuated to create a suction effect so as to draw the carrier 15 through the conduit 11 and thread the conduit 11 with the line 16.

With reference to FIGURE 1b, one end of the 16 is secured to an electrical cable C; and the reel 17 may be turned so as to draw the line 16 and the cable C through the conduit 11.

With reference to FIGURE 2, there is illustrated a block 18 of polyfoam plastic material, such as foamed polyurethane; and a cutter 19 or any suitable means may be utilized to cut a plurality of plugs or body members from the block 18. The cutter 19 could be manually manipulated, or if desired, a suitable arbor press could be utilized to punch a plug out of the block 18. The plugs may be of any desired size and form, and FIGURE 2 illustrates that a series of cylindrical holes 20 (as well as a rectangular hole 21) have previously been formed in the block 18. The polyfoam material is very easy to work with, an simple hand tools are all that is required to form a desired size and shape of a carrier body. Moreover, the particular size may be molded directly, if desired. The thickness or length of a cylindrical section is determined or controlled by the ultimate resilience and density that is required in the completed carrier. These factors may be varied at will by lengthening or shortening the cylindrical section, as well as by varying the actual structure of the polyfoam material.

With reference to FIGURE 3, there is illustrated a plurality of cylindrical plugs 22, 22', and 22" of varied length and diameter that may be cut from the block 18.

With reference to FIGURES 4a and through 4d, the plug 22 may be formed with an axial bore 23 for ultimate insertion therein of a crimped eyelet or grommet 24, which (preferably) is lightweight and corrosion-resistant. The grommet 24 (which comprises a hollow cylindrical sleeve as shown in the drawings) is then pinched together by a simple hand tool which is adapted to swage over one end of the grommet 24 back upon itself. In the process, the cylindrical plug 22 is axially compressed by a certain amount, such that it assumes or approaches the shape of a sphere or ball. Then, as shown in FIGURE 4d, the line 16 may be passed down within the swaged-over grommet 24, the grommet or eyelet 24 in effect providing a reinforced centrally-located aperture within the plug 22, as shown in FIGURES 4a through 4d; and a pair of knots 25 and 25' may be formed in the line 16 on either side of the plug 22 so as to retain the line 16 to the plug 22. The line 16 may be of polypropylene, which is lightweight, has good tensile strength, and is relatively inexpensive. Moreover, at one end of the line 16, a bulge may be formed by the application of heat to the line 16, which causes the fibres of the polypropylene line to become fused together; and thus the plug 22 is prevented from slipping off of the line 16, should the knots 25 and 25' become undone through repeated usage of the carrier.

With reference to FIGURE 5a through 5d there is illustrated a two-piece grommet 27 and 28 for use on the plug 22. The grommet 27, 28 is swaged together, as shown in FIGURE 5b, and thus the plug 22 is axially compressed and acquires a substantially spherical or ball-like form. Then, as shown in FIGURE 5c, a pair of retainers 29 and 29' may be slid along the line 16 towards the plug 22 and then clamped down rigidly against the line 16, as shown in FIGURE 5d, so as to retain the plug 22 against movement along the line 16.

With reference to FIGURE 6, the plug 22 has a relatively dense open-cell structure including a plurality of openings, one of which is shown as at 30; and with reference to FIGURE 7, it will be appreciated that when plug 22 is axially compressed (in the process of securing the grommet 24 to the plug 22) the cellular structure of the plug 22 is changed so that the openings, now designated as at 31, are smaller than the openings 30 shown in FIGURE 6. Moreover, the plug 22, as shown in FIGURE 7, has a denser structure surrounding the grommet 24 than at the outer edges of the plug 22, which are approximately the same as that shown in FIGURE 6. The grommet 24 forms a hub for the plug 22, and the carrier 15 that is thus formed may pass freely through the conduit 11 with the outer circumference of the carrier 15 engaging the inner walls of the conduit 11.

With reference to FIGURE 8, there is shown a pair of cylindrical plugs 32 and 33, stacked on top of one another; and a bolt 34, in combination with a locking nut 35 and a pair of washers 36 and 36', holds the plugs 32 and 33 together and squeezes the plugs axially so as to assume a generally spherical shape. The bolt 34 has an eyelet 37 and the line 16 may be secured thereto.

With reference to FIGURE 9, a needle 38 having an eye 39 may be forced through the plug 40 of polyfoam material so as to draw the line 16 through the plug 40 without previously forming a bore therein; and as shown in FIGURE 10, the line 16 may thus be drawn through the plug 40 and secured thereto by means of knots 41 and 41' in combination with washers 42 and 42'.

With reference to FIGURES 11 and 12, there is shown a kink or bend 43 which may be formed in the conduit 11; and as shown more particularly in FIGURE 12, the carrier 15 is adapted to instantaneously assume the given internal cross-section or configuration of the conduit 11 so as to pass freely therethrough.

With reference to FIGURE 13, there is shown an internal obstruction 44 within the conduit 11, and the compressible nature of the carrier 15 enables it to pass by the obstruction 44.

With reference to FIGURE 14, there is illustrated a portable kit box 45 which may be prepared for use in the field. The kit box 45 contains a number of pre-fabricated carriers 15, together with a reel 17, one or more nozzles 14, and assorted hardware.

Obviously, many modifications may be made without departing from the basic spirit of the present invention; and accordingly, within the scope of the appended claims, the invention may be practiced other than has been specifically described.

I claim:
1. The method of fabricating a carrier for use in conjunction with conduit-threading apparatus, which comprises the steps of:
    (a) forming a compressible body having an open cell structure;
    (b) forming an axial bore in said body;
    (c) inserting a grommet comprising a hollow cylindrical sleeve within said axial bore;
    (d) axially compressing the grommet and swaging over its respective ends, whereby said body is compressed radially adjacent to said grommet;
    (e) passing a line loosely through said swaged-over grommet; and
    (f) securing the line against removal through said grommet and from said body.
2. The method of claim 1, wherein:
    (a) said body is made from a polyfoam plastic material; and wherein
    (b) said line is made from a polypropylene material.
3. For use in conjunction with a conduit-threading apparatus, a carrier structure comprising:
    (a) a body formed from a polyfoam type of plastic material which has a compressible, cellular structure and which is adapted to deform and to instantaneously assume the cross-section of the conduit through which the carrier passes;
    (b) said body comprising at least one cylindrical plug having an axial bore formed therein;
    (c) a grommet comprising a hollow cylindrical corrosion-resistant sleeve received within said axial bore;
    (d) said grommet being axially compressed together and having its respective ends swaged over, whereby said body approaches a substantially spherical shape and acquires a greater density radially adjacent of said grommet, and whereby an easily-accessible reinforced central aperture is provided in said body;
    (e) a polypropylene line passed loosely through said grommet with radial clearance therebetween; and
    (f) means to secure said line against removal through said grommet and from said body.

References Cited in the file of this patent
UNITED STATES PATENTS

| | | |
|---|---|---|
| 526,141 | Bloomer | Sept. 18, 1894 |
| 2,906,650 | Wheaton | Sept. 29, 1954 |
| 3,015,150 | Fior | Jan. 2, 1962 |